(12) United States Patent
Taylor et al.

(10) Patent No.: US 8,887,220 B2
(45) Date of Patent: Nov. 11, 2014

(54) NETWORK INTERFACE DEVICES

(75) Inventors: Darrell Taylor, Lithonia, GA (US);
Steven L. McDonald, Lucust Grove, GA (US); Alfonso Jones, Suwanee, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1259 days.

(21) Appl. No.: 12/180,286

(22) Filed: Jul. 25, 2008

(65) Prior Publication Data
US 2010/0023994 A1 Jan. 28, 2010

(51) Int. Cl.
*H04N 7/173* (2011.01)
*H04N 7/16* (2011.01)
*H04N 21/418* (2011.01)
*H04N 21/442* (2011.01)

(52) U.S. Cl.
CPC .......... *H04N 7/165* (2013.01); *H04N 21/418* (2013.01); *H04N 21/44231* (2013.01)
USPC ............ 725/107; 725/116; 725/146; 725/148

(58) Field of Classification Search
USPC ....................................................... 725/107
See application file for complete search history.

(56) References Cited

U.S. PATENT DOCUMENTS

| 5,740,176 | A | | 4/1998 | Gupta et al. |
| 5,808,767 | A | | 9/1998 | Williams et al. |
| 6,018,452 | A | | 1/2000 | Meyerhoefer et al. |
| 6,112,232 | A | * | 8/2000 | Shahar et al. ................. 709/217 |
| 6,252,952 | B1 | | 6/2001 | Kung et al. |
| 6,272,151 | B1 | | 8/2001 | Gupta et al. |
| 6,526,581 | B1 | * | 2/2003 | Edson .............................. 725/74 |
| 6,684,030 | B1 | | 1/2004 | Taylor et al. |
| 6,847,718 | B1 | * | 1/2005 | Hiraoka .......................... 379/413 |
| 6,931,659 | B1 | * | 8/2005 | Kinemura ....................... 725/111 |
| 7,020,249 | B1 | | 3/2006 | Haines et al. |
| 7,117,520 | B2 | * | 10/2006 | Stewart .......................... 725/106 |
| 7,149,474 | B1 | | 12/2006 | Mikhak |
| 7,180,988 | B2 | | 2/2007 | Phillips et al. |
| 7,239,628 | B1 | | 7/2007 | Pendleton et al. |
| 7,558,251 | B1 | | 7/2009 | Huang et al. |
| 8,006,275 | B1 | * | 8/2011 | Poole et al. ...................... 725/96 |
| 8,085,798 | B2 | * | 12/2011 | Cha ................................ 370/401 |

(Continued)

OTHER PUBLICATIONS

"Adtran Quad FXS+ Voice Interface Card (1202300L1)," http://www.mysimon.com/9015-11587_8-20180039.html, search dated Jul. 18, 2008, 2 pages.

(Continued)

*Primary Examiner* — Mushfikh Alam
(74) *Attorney, Agent, or Firm* — Toler Law Group, PC

(57) ABSTRACT

Network interface devices and methods are provided. A particular network interface device includes a first network interface adapted to terminate one or more communication lines and a second network interface to terminate at least one coaxial line. The network interface device also includes at least one interface connector adapted to receive a removable plug-in module. The removable plug-in module includes a video unit that is operable to receive video data from a network device via at least one of the one or more communication lines and to process the video data for communication via the at least one coaxial line or a twisted wire pair when the plug-in module is connected to the at least one interface connector. The removable plug-in module also includes a power coupling device to receive power via at least one of the one or more communication lines.

24 Claims, 4 Drawing Sheets

(56) References Cited

U.S. PATENT DOCUMENTS

| | | |
|---|---|---|
| 8,279,805 B2 | 10/2012 | Taylor et al. |
| 8,438,607 B2 * | 5/2013 | Cholas et al. ............... 725/114 |
| 8,561,120 B2 * | 10/2013 | Will et al. .................... 725/131 |
| 2002/0009099 A1 | 1/2002 | D'Onofrio |
| 2002/0040475 A1 * | 4/2002 | Yap et al. ...................... 725/39 |
| 2002/0105955 A1 * | 8/2002 | Roberts et al. ............... 370/401 |
| 2002/0199203 A1 * | 12/2002 | Duffy et al. .................. 725/109 |
| 2003/0035540 A1 * | 2/2003 | Freeman et al. ............. 380/210 |
| 2003/0161333 A1 | 8/2003 | Schain et al. |
| 2003/0233667 A1 * | 12/2003 | Umipig et al. ............... 725/152 |
| 2004/0074656 A1 | 4/2004 | Bloodworth et al. |
| 2004/0150751 A1 * | 8/2004 | Phillips et al. ............... 348/565 |
| 2004/0172657 A1 | 9/2004 | Phillips et al. |
| 2004/0179541 A1 | 9/2004 | Godwin |
| 2004/0226034 A1 * | 11/2004 | Kaczowka et al. ............. 725/9 |
| 2004/0228336 A1 | 11/2004 | Kung et al. |
| 2004/0233860 A1 | 11/2004 | Campbell et al. |
| 2005/0086694 A1 * | 4/2005 | Hicks et al. .................... 725/79 |
| 2005/0155086 A1 * | 7/2005 | Schick et al. ................ 725/153 |
| 2005/0235307 A1 * | 10/2005 | Relan et al. .................... 725/14 |
| 2005/0265240 A1 | 12/2005 | Jain et al. |
| 2006/0187071 A1 | 8/2006 | Kortum et al. |
| 2006/0209857 A1 | 9/2006 | Hicks, III |
| 2006/0251094 A1 | 11/2006 | Van Vleck et al. |
| 2006/0271985 A1 * | 11/2006 | Hoffman et al. ............. 725/111 |
| 2006/0291493 A1 | 12/2006 | Schley-May et al. |
| 2007/0192814 A1 * | 8/2007 | Southerland et al. ......... 725/105 |
| 2007/0217436 A1 | 9/2007 | Markley et al. |
| 2007/0272440 A1 | 11/2007 | Grunwald et al. |
| 2007/0276771 A1 | 11/2007 | Saeger |
| 2007/0277205 A1 | 11/2007 | Grannan |
| 2008/0194272 A1 * | 8/2008 | Smith et al. ................ 455/456.3 |
| 2008/0205285 A1 * | 8/2008 | Scherer ........................ 370/245 |
| 2009/0089823 A1 * | 4/2009 | Mears ............................ 725/14 |
| 2009/0100492 A1 * | 4/2009 | Hicks et al. .................. 725/127 |
| 2010/0020821 A1 * | 1/2010 | Droms et al. ................. 370/465 |
| 2010/0071009 A1 * | 3/2010 | Xiu et al. ........................ 725/64 |
| 2010/0083337 A1 * | 4/2010 | Williams et al. ............. 725/132 |
| 2010/0107186 A1 * | 4/2010 | Varriale et al. ................ 725/31 |
| 2011/0044347 A1 | 2/2011 | Taylor et al. |
| 2011/0289526 A1 * | 11/2011 | Poole et al. .................... 725/14 |
| 2011/0296481 A1 * | 12/2011 | Cholas et al. ................ 725/109 |
| 2012/0320761 A1 | 12/2012 | Taylor et al. |

OTHER PUBLICATIONS

"Plug-and-play," Wikipedia, the free encyclopedia, http://en.wikipedia.org/wiki/Plug-and-play, Jul. 18, 2008, 2 pages.

"Extend Your Network Into Subscribers' Homes With the 2WIRE HomePortal iNID (Intelligent Network Interface Device), the Industry's First Outdoor Residential Gateway," retrieved from <<http://www.2wire.com/?p=326>>, Jun. 9, 2009, 2Wire, Inc., San Jose, CA, pp. 1-2.

* cited by examiner

NETWORK INTERFACE DEVICES

FIELD OF THE DISCLOSURE

The present disclosure is generally related to network interface devices.

BACKGROUND

Improvements in technology have led to an increase in service providers offering so called "triple play" services. Triple play services provide voice, video and data service to a subscriber from a single provider. Offering triple play services that meet customer expectations in an efficient manner can be challenging. For example, video services provided by certain triple play service providers may not be compatible with existing wiring systems in subscriber residences. Thus, providing triple play services may require the installation of new residential wiring, which can significantly increase the cost of new installations.

DETAILED DESCRIPTION OF THE DRAWINGS

Figure 1:
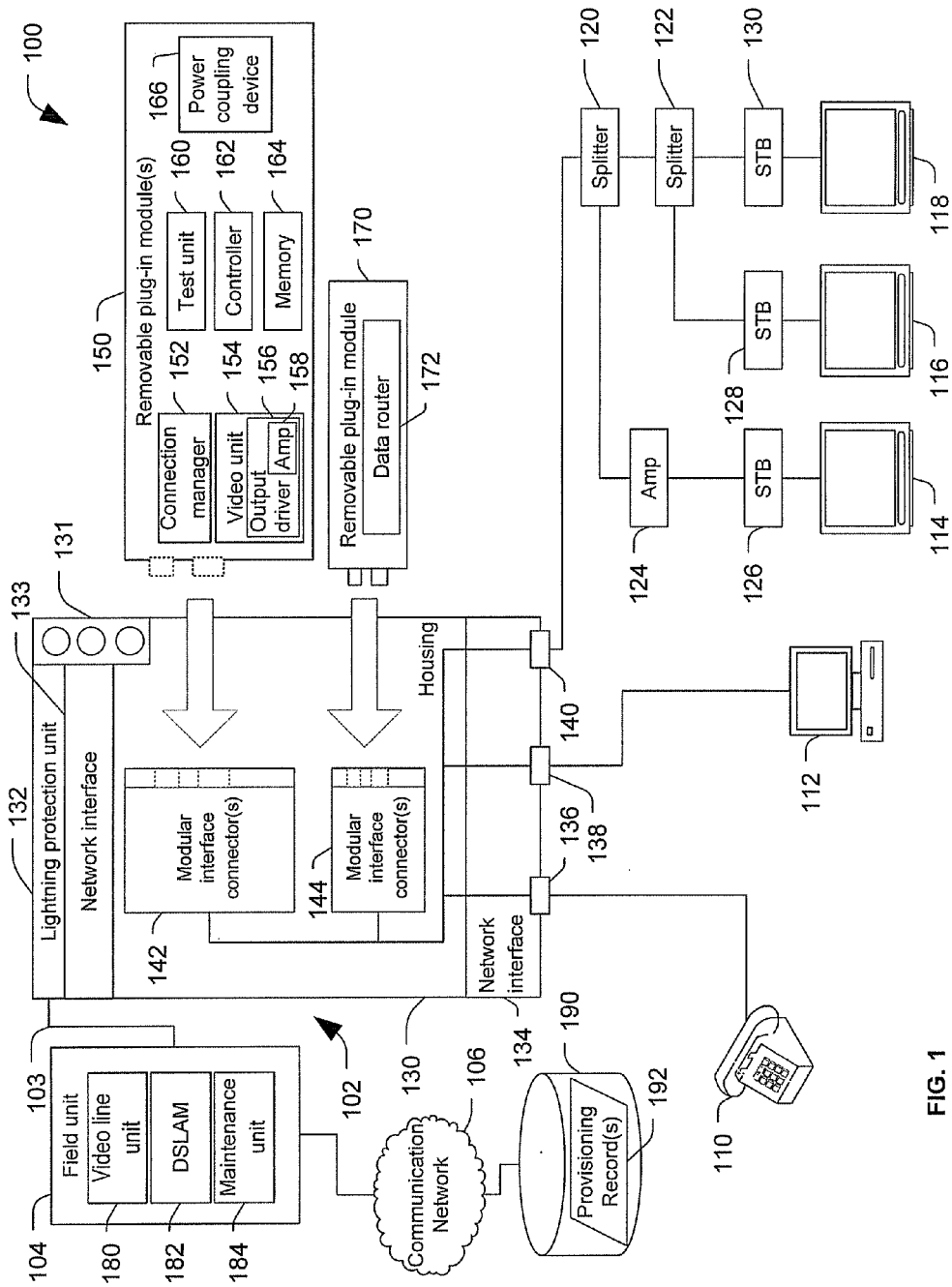
FIG. 1 is a block diagram of a first embodiment of a system including a network interface device.

Network interface devices and methods are disclosed. In a particular embodiment, a network interface device includes a first network interface adapted to terminate one or more communication lines and a second network interface to terminate at least one coaxial line. The network interface device also includes at least one interface connector adapted to receive a removable plug-in module. The removable plug-in module includes a video unit that is operable to receive video data from a network device via at least one of the one or more communication lines and to process the video data for communication via the at least one coaxial line or a twisted wire pair when the plug-in module is connected to the at least one interface connector. The removable plug-in module also includes a power coupling device to receive power via at least one of the one or more communication lines.

In another particular embodiment, a method includes coupling a coaxial line interface of a network interface device (NID) to a coaxial wiring system at a customer premise. The method includes connecting a line interface of the NID to at least one set of communication lines to couple the NID to a remote communication network. The method further includes connecting one or more plug-in modules to an interface connector of the NID. Each plug-in module receives power via the at least one set of communication lines. A plug-in module may be operable to process video data received from the remote communication network for communication via the coaxial wiring system.

In another particular embodiment, a device includes a housing and a network interface device (NID) within the housing. The NID includes at least one lightning protection device coupled to a network interface. The network interface includes connectors to a remote communication network via at least one first set of twisted pair wires. The device also includes a local network interface within the housing. The local network interface including at least one coaxial connector. The device further includes a gateway within the housing. The gateway includes a router to route data received from the remote communication network to one or more devices coupled to the local network interface. The device also includes a line conditioning unit within the housing. The line conditioning unit conditions the at least one first set of twisted pair wires for data communication. The device also includes a video unit within the housing. The video unit receives video data from the remote communication network and processes the video data for communication via the at least one coaxial connector. The device also includes a diagnostic unit within the housing. The diagnostic unit monitors performance of the video unit, the gateway, the line conditioning unit, and the at least one first set of twisted pair wires. The device further includes a power coupling device coupled to the network interface. The power coupling device receives power via the one or more first sets of twisted pair wires and provides operating power to the gateway, the line conditioning unit, the video unit and the diagnostic unit.

FIG. 1 depicts a first particular embodiment of a system including a network interface device. The system is designated generally 100. The system 100 includes a network interface device 102 coupled to a field unit 104 of a communication network 106. For example, the communication network 106 may be associated with a provider of triple play services. In a particular embodiment, the network interface device 102 may be attached to an exterior of a customer premise, such as a residence or business, to terminate communication lines from the communication network 106 and to terminate communication lines from the customer premise.

The network interface device 102 is adapted to receive data from the communication network 106 and distribute the data to devices at a customer residence. For example, the devices to which the data is distributed may include one or more telephones 110, one or more computers 112, one or more display devices 114-118, one or more set-top box devices 126-130, or any combination thereof. The data may include voice, video or computer data. The network interface device 102 may send the data to the devices via one or more intermediate devices. For example, video data may be provided to the one or more display devices 114-118 via one or more splitters 120 and 122, one or more amplifiers 124, the one or more set-top box devices 126-130, or any combination thereof.

The network interface device 102 may include a housing 130 adapted to provide climate protection to components housed therein. In a particular embodiment, the housing 130 may also be adapted to restrict access to one or more portions of the network interface device 102. For example, the network interface device 102 may include a customer accessible portion and a service provider accessible portion. The network interface device 102 may also include a lightning protection unit 132. The lightning protection unit 132 may include lightening protection coils adapted to protect electronic equipment within the network interface device 102 (at the customer's residence) from harmful effects of a lightning strike at the communication network 106, the field unit 104, the network interface device 102, or any connection point or communication line there between.

In a particular embodiment, the network interface device 102 includes a first network interface 133 including one or more connectors to terminate one or more communication lines 103 from the communication network 106. The communication lines 103 may include one or more twisted pair lines (e.g., telephone lines), one or more non-twisted lines (e.g., a T-1 line, an E-1 line or a coaxial cable line), or any combination thereof. The network interface device 102 also includes a second network interface 134 including one or more connectors 136-140 to terminate communication lines of the customer premise. The connectors 136-140 may include one or more connectors for a twisted pair line, a non-twisted pair line, and a coaxial cable line. For example, the connectors may include a standard telephone jack (e.g., an RJ11 jack), an Ethernet jack (e.g., an RJ45 jack), a coaxial line connection (e.g., an F connector), or any other local network connector to connect a wiring system at the customer premise to the network interface device 102.

In a particular embodiment, the network interface device 102 includes one or more modular interface connectors 142, 144. The modular interface connectors 142, 144 may be adapted to receive one or more removable plug-in modules that provide particular functionality to the network interface device 102. In an illustrative embodiment, when no removable plug-in modules are provided, the network interface device may provide access only to voice service (e.g., telephone service) at the customer residence. Either video service (e.g., television), data service (e.g., computer data communications), or both may be conveniently added to the network interface device via the one or more removable plug-in modules. In other embodiments, other services or combinations of services available via the communication network 106 can be provided by the network interface device 102 alone or by the network interface device 102 in combination with one or more removable plug-in modules. For example, the network interface device 102 alone (i.e., without any removable plug-in modules) may not provide access to any of the services of the communication network 106. In another example, one removable plug-in module may provide access to voice, video and data services.

In the particular example illustrated in FIG. 1, a first modular interface connector 142 is adapted to receive a first removable plug-in module 150. The first removable plug-in module 150 may includes a video unit 154 to access video services available via the communication network 106. When the first removable plug-in module 150 is coupled to the first modular interface connector 142, the video unit 154 may be enabled to receive video data from the field unit 104 via the one or more communication lines 103 and to process the video data for communication via at least one coaxial line or at least one twisted pair line to the one or more display devices 114-118. In a particular embodiment, the video unit 154 may include an output driver 156 adapted to communicate the processed video data via wiring at the customer premise (e.g., one or more coaxial lines or one or more twisted pair lines) to at least one of the set-top box devices 126-130 for display at one or more of the display devices 114-118.

In an illustrative embodiment, the video data may include Internet Protocol Television (IPTV) data. The video data may be communicated from a video line unit 180 of the field unit 104. The video line unit 180 may modulate the video data and communicate the modulated video data via the one or more communication lines 103 to the network interface device 102. At the network interface device 102, the video unit 154 may demodulate the video data to communicate the data via the second network interface 134 to one or more devices at the customer premise. In a particular embodiment, the video line unit 180 modulates the video data in accordance with a very high-speed digital subscriber line (VDSL) protocol and the video unit 154 demodulates the modulated video data to generate a home telephone line network alliance (HPNA) protocol signal for communication via the second network interface 134 to devices at the customer premise.

In a particular embodiment, the output driver 156 may include a signal amplifier 158. The signal amplifier 158 may be adapted to amplify the processed video signal for communication to the one or more user devices coupled to the second network interface 134. In an illustrative embodiment, the network interface device 102 and the display devices 114-118 at the customer premise are coupled to a pre-existing coaxial cable network (i.e., a coaxial cable network that was installed at the customer premise before the network interface device 102 was installed at the customer premise). In this embodiment, the coaxial cable network may include one or more communication paths that are not direct paths between the network interface device 102 and the display devices 114-118 or the set top box devices 126-130. For example, the coaxial cable network may include the splitters 120 or 122, the amplifier 124, or other devices (not shown). The signal amplifier 158 may be adapted to amplify the signal sufficiently to communicate the amplified signal to the set-top box devices 126-130 or the display devices 114-118 for display.

In a particular embodiment, the first removable plug-in module 150 may also include a test unit 160. The test unit 160 may be adapted to loop signals received from the field unit 104 back to the field unit 104 in response to a signal received from the communication network 106. For example, the test unit 160 may loopback the signals in response to a loopback test signal received from a maintenance unit 184 of the field unit 104 or from the communication network 106. Loopback testing may enable the maintenance unit 184 to identify communication problems between the field unit 104 and the first plug-in module 150, or between the communication network 106 and the first plug-in module 150.

In a particular embodiment, the first removable plug-in module 150 may also include a connection manager 152. The connection manager 152 may be operable to manage a connection to the communication network 106 via the one or more communication lines 103. For example, the connection manager 152 may be operable to communicate with the video line unit 180, a digital subscriber line modem (DSLAM) 182 or another component of the field unit 104 to condition the one or more communication lines 103 for data communication.

In a particular embodiment, the connection manager 152 or the test unit 160 may be operable to execute function testing of other components of the first removable plug-in module 150, another removable plug-in module (e.g., a second removable plug-in module 170), another component of the network interface device 102, a device at the customer premise (such as one of the set-top box devices 126-130), or any combination thereof. In an illustrative embodiment, the connection manager 152 or the test unit 160 may communicate results of the testing to the maintenance unit 184 for analysis and follow-up (e.g., to dispatch an appropriate technician to repair a detected problem). In another illustrative embodiment, the connection manager 152 or the test unit 160 may store performance data associated with the tested components at a memory 164. The connection manager 152 or the test unit 160 may analyze the performance data and communicate results of the performance data analysis to the maintenance unit 184. For example, analyzing the performance data may include comparing the performance data to one or more operational criteria associated with a particular component to identify one or more operational concerns before the operational concern becomes perceptible by a user at the customer premise. The connection manager 152 or the test unit 160 may also be adapted to provide a status display indicating whether one or more communication problems or other operational concerns have been identified. For example, the network interface device 102 may include a visual status display 131, such as red, yellow and green lights that indicate whether the network interface device 102 or one or more components of the network interface device 102 are functioning properly and able to communicate with the communication network 106.

In a particular embodiment, the first removable plug-in module 150 includes a controller 162. The controller 162 may be adapted to detect connection of the first removable plug-in module 150 to the first modular interface connector 142. In response to detecting connection of the first removable plug-in module 150 to the first modular interface connector 142, the controller 162 may automatically initialize video data processing at the video unit 154. Thus, when the first removable plug-in module 150 is connected to the first modular interface connector 142, the first removable plug-in module 150 may be automatically initiated and may automatically initiate communication with the communication network 106 to allow functionality of the first removable plug-in module 150 to be accessible to the user.

In a particular embodiment, the network interface device 102 and the one or more removable plug-in modules 150 and 170 may be line powered. For example, the first removable plug-in module 150 may include a power coupling device 166. The power coupling device 166 may be adapted to receive power via the one or more communication lines 103 from the communication network 106. The power coupling device 166 may provide operating power to the network interface device 102 and to one or more of the components of the network interface device 102 (e.g., the first removable plug-in module 150, the second removable plug-in module 170, the visual display 131, other removable plug-in modules or other components, or any combination thereof). By providing line power via one or more of the removable plug-in modules 150 and 170, no additional power interface may be required for the network interface device 102. For example, no other connection to a power source outside the network interface device 102 may be required. Additionally, by providing line power via one or more of the removable plug-in modules 150 and 170, the network interface device 102 may remain unpowered until the one or more removable plug-in modules 150 and 170 are connected to modular interface connectors 142 and 144. In a particular illustrative embodiment, each removable plug-in module 150 and 170 may include a power coupling device to provide line power for itself and/or one or more other components of the network interface device 102.

In a particular embodiment, the network interface device 102 includes the second modular interface connector 144. The second modular interface connector 144 may be adapted to receive a second removable plug-in module 170. The second removable plug-in module 170 may enable other functionality at the network interface device 102. For example, where the first removable plug-in module 150 enables access to video services, the second removable plug-in module 170 may enable access to voice services or computer data communications. In another example, other functionality may be enabled via the second removable plug-in module 170, for example administrative functions, such as line conditioning, testing, performance monitoring, power coupling, or other functions of the connection manager 152, the test unit 160, the controller 162, the memory 164, the power coupling device 166, or any combination thereof may be provided via the second removable plug-in module 170.

In a particular embodiment, the second removable plug-in module includes a data router 172. The data router 172 may be adapted to receive communication data via the one or more communication lines 103 from the communication network 106 and to route the communication data to one or more devices connected to the second network interface 134. For example, the data router 172 may receive voice data (e.g., plain old telephone service or voice over Internet protocol data) from the communication network 106 and communicate the voice data to the telephone 110. In another example, the data router 172 may receive computer communication data (e.g., Internet protocol data) from the communication network 106 and route the computer communication data to the computer 112. In still another example, the data router 172 may receive video data (e.g., IPTV data) from the communication network 106 and route the video data to the one or more display devices 114-118 or the one or more set-top box devices 126-130. In a particular illustrative embodiment, the data router 172 may be included on the first removable plug-in module 150, accordingly the first removable plug-in module 150 may provide video processing capability as well as data routing capability to the network interface device 102. In another particular embodiment, the data router 172, the video unit 154, the connection manager 152, the test unit 160, the controller 162, the memory 164 and the power coupling device 166 may be on any combination of the removable plug-in modules 150 and 170 allowing any combination of functionality to be provided to the network interface device 102 based on a particular configuration desired.

In a particular embodiment, the controller 162 is adapted to send a provisioning request to the communication network 106 in response to detecting connection of a removable plug-in module to one of the modular interface connectors 142 and 144. In response to the provisioning request, the communication network 106 may store a provisioning record 192 at a database 190 associated with the communication network 106. The provisioning record 192 may associate an identification for the removable plug-in module 150 or 170 with a subscriber account associated with the customer premise. The provisioning record 192 may enable provision of communication services (e.g., voice, video and/or data services) via the removable plug-in module 150 or 170 to the customer premise.

Figure 2:
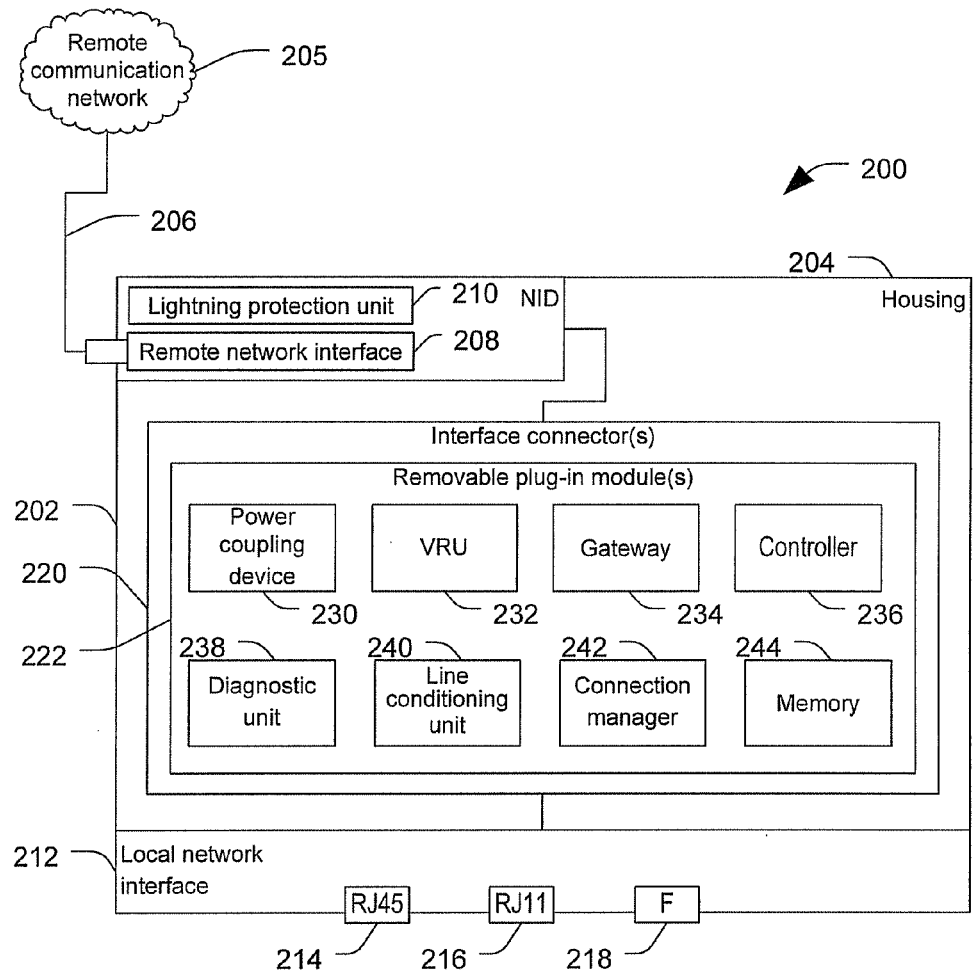
FIG. 2 is a block diagram of a second embodiment of a system including a network interface device.

FIG. 2 depicts a second particular embodiment of a system including a network interface device. The system is generally designated 200. The network interface device 202 may be coupled via one or more communication lines 206 to a remote communication network 205. The communication lines 206 may include one or more twisted pair communication lines (e.g., telephone lines), one or more non-twisted pair communication lines (e.g., a T-1 line, an E-1 line or a coaxial communication line), or any combination thereof.

The network interface device 202 includes a housing 204 to provide physical protection to one or more components of the network interface device 202. The network interface device 202 may also include a lightning protection unit 210 and a remote network interface 208. The remote network interface 208 and lightning protection unit 210 may be coupled to the communication lines 206 to provide protection against lightning strikes and to terminate the communication lines 206. The network interface device 202 may also include one or more local network interfaces 212 to terminate one or more connections to wiring at a customer premise. For example, the local network interface 212 may include a number of interface connectors adapted to communicate data to various user devices at a customer premises. The interface connectors may include one or more modular sockets, plugs or jacks to terminate one or more twisted pair lines. For example, the interface connectors may include RJ45 jacks 214, RJ11 jacks 216, RJ14 jacks (not shown), RJ25 jacks (not shown) or any other six position or eight position plug jacks or other modular connector. The local network interface 212 may also include one or more connectors for other types of communication lines, such as coaxial cables. For example, the local network interface 212 may include one or more F connectors 218 to terminate one or more coaxial cable lines. In an illustrative embodiment, the local network interface 212 may terminate connections to wiring at the customer premise to provide voice data to one or more telephones via a modular telephone connector, to provide computer data (e.g., broadband data communications) to one or more computers via one or more Ethernet or data network connectors (such as the RJ45 connector), and to provide video data to one or more display device via one or more coaxial connectors or twisted wire pair connectors.

In a particular embodiment, the network interface device 202 may include one or more interface connectors 220. The interface connectors 220 may be adapted to receive one or more removable plug-in modules 222. The removable plug-in modules 222 may include any combination of modules which provide line power, video processing, data routing, diagnostics, line conditioning, memory, connection management or other functionality to the network interface device 202. In an illustrative embodiment, the removable plug-in modules 222 may include a power coupling device 230 adapted to receive power via the one or more sets of communication lines 206 and to provide operating power to other components within the network interface device 202, such as, for example, a gateway 234, a line conditioning unit 240, a video unit 232, a diagnostic unit 238, a connection manager 242, a controller 236, or any combination thereof.

In a particular embodiment, the removable plug-in modules 222 may include a video unit 232 (also called a video remote unit or "VRU"). The video unit 232 may be adapted to receive video data from the remote communication network 205 via the one or more communication lines 206. The video unit 232 may process the video data for communication via the at least one coaxial connectors 218 or one or more other connectors at the local network interface 212. For example, the video unit 232 may receive modulated video data via the communication line 206 and may demodulate the video data for distribution via the local network interface 212.

In a particular embodiment, the removable plug-in modules 222 may include a gateway module 234. The gateway module 234 is adapted to route data received via the remote communication network 205 to one or more devices coupled to the local network interface 212. For example, the gateway 234 may include a residential gateway adapted to provide network address translation (NAT) for devices coupled to the local network interface 212. The gateway module 234 may route the data based at least partially on a type of the data. For example, voice data may be routed to a telephone or voice over Internet protocol device coupled to the local network interface 212. In another example, computer communication data (e.g., Internet protocol data, transmission control protocol data, or data in another computer-to-computer communication protocol) may be routed to a computing device coupled to the local network interface 212. In still another example, video data may be routed to the video unit 232 for processing or from the video unit 232 to one or more display devices or set-top box devices for display.

In a particular embodiment, the removable plug-in modules 222 include the controller 236. The controller 236 may be adapted to detect when one or more removable plug-in modules 222 are coupled to the interface connectors 220 and to automatically enable service to the one or more removable plug-in modules 222. For example, when the controller 236 detects that the video unit 232 has been plugged into the interface connectors 220, the controller 236 may send a provisioning request via the communication lines 206 to store a record at the remote communication network 205. The provisioning record may be used by the remote communication network 205 to enable the video unit 232, to enable provisioning of video data to the video unit 232.

The removable plug-in modules 222 may also include a diagnostic unit 238. The diagnostic unit 238 is adapted to monitor performance of one or more of the removable plug-in modules 222 or other component of the network interface device 202. In an illustrative embodiment, the diagnostic unit 238 is adapted to initiate loop back testing of the communication line 206 and network interface device 202 in response to a request received via communication line 206. In another illustrative embodiment, the diagnostic unit 238 is adapted to provide a visual display or other information to indicate an operational status of the network interface device 202, one or more components of the network interface device 202, communications with the remote communication network 205, or any combination thereof. For example, the diagnostic unit 238 may be adapted to activate a green, yellow or red light to indicate whether the network interface device 202 and components therein are functioning properly.

In a particular embodiment, the removable plug-in modules 222 may include a line conditioning unit 240. The line conditioning unit 240 is adapted to condition the communication lines 206 for data communications. In a particular embodiment, the line conditioning unit 240 operates in conjunction with a remote line conditioning unit at the remote communication network to condition the communication lines 206. The removable plug-in modules 222 may also include a connection manager 242. The connection manager 242 is adapted to manage a data communication connection between the network interface device 202 and the remote communication network 205.

In a particular embodiment, the removable plug-in modules 222 may include one or more memory devices 244. The memory devices 244 may be adapted to store performance data related to one or more of the components of the network interface device 202. In a particular embodiment, each of the one or more removable plug-in modules 222 stores its performance data at the memory 244. In another particular embodiment, the controller 236 polls the one or more removable plug-in modules 222 to gather the performance data and stores the gathered performance data at the memory 244. In still another particular embodiment, the diagnostic unit 238 determines performance data related to one or more components of the network interface device 202 and stores the performance data at the memory 244. In yet another particular embodiment, the diagnostic unit 238 determines performance data related to one or more components of the network interface device 202 and analyzes the performance data. The diagnostic unit 238 stores the analyzed performance data at the memory 244 for communication via the communication line 206 to the remote communication network 205.

The one or more removable plug-in modules 222 may be arranged in any configuration, form factor, or combination. For example, any one or more of the video unit 232, the gateway 234, the power coupling device 230, the diagnostic unit 238, the line conditioning unit 240, the connection manager 242, the controller 236, and the memory 244 may be on a single module, such as an interface card. In another example, the gateway 234 and the video unit 232 may be on separate modules. In yet another example, the removable plug-in modules 222 may include a number of interface cards. Each of the interface cards may include its own power coupling device, memory, controller, diagnostic unit, line conditioning unit, connection manager or any combination thereof.

Figure 3:
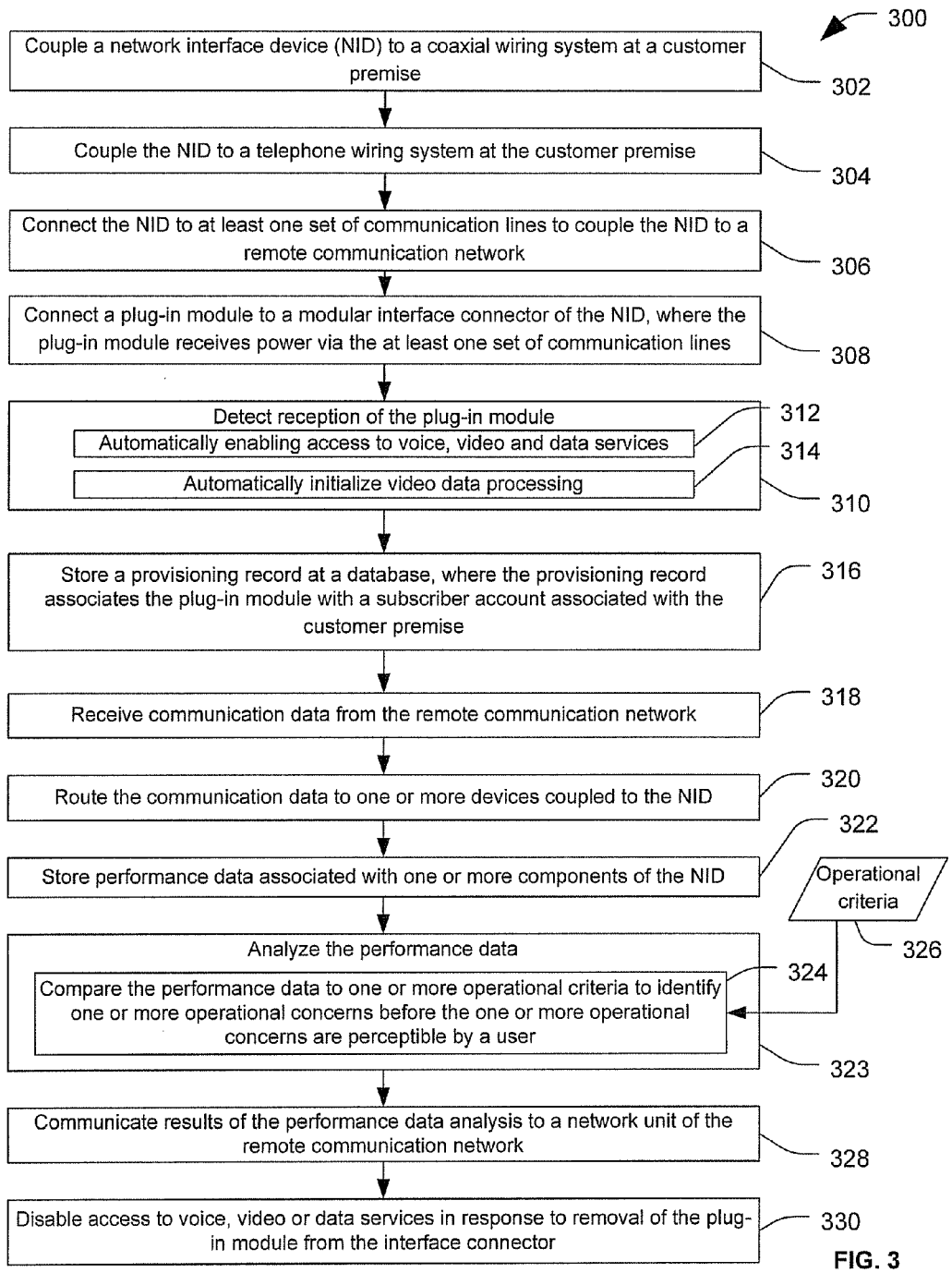
FIG. 3 is a flow chart of an embodiment of a method of using a network interface device.

FIG. 3 depicts a first particular embodiment of a method of using a network interface device, the method designated generally 300. The method 300 includes, at 302, coupling a network interface device to a coaxial wiring system at a customer premise. In a particular embodiment, the coaxial wiring system includes a pre-existing wiring system at the customer premises, such as a wiring system previously installed for cable television access. The coaxial wiring system may include one or more communication paths that are not direct connections from the network interface device to a display device or set-top box device. For example, the coaxial wiring system may include one or more splitters, one or more amplifiers, or any combination thereof. The method 300 also includes, at 304, coupling the network interface device to a telephone wiring system at the customer premise. The method 300 includes, at 306, connecting the network interface device to at least one set of communication lines to couple the network interface device to a remote communication network. For example, the set of communication lines may include one or more twisted pair lines e.g., a telephone line), one or more non-twisted pair lines (e.g., a T-1 line, an E-1 line, or a coaxial line), or any combination thereof.

The method 300 also includes, at 308, connecting a plug-in module to a modular interface connector at the network interface device. In a particular embodiment, the plug-in module is line powered, that is, the plug-in module receives power via the one or more sets of communication lines coupled to the network interface device. The one or more plug-in modules may provide particular functionality to the network interface device. For example, the plug-in modules may enable voice, video or data communications via the remote communication network at the customer premise.

In a particular embodiment, the method 300 includes, at 310, detecting reception of the plug-in module at the modular interface connector. After detecting reception of the plug-in module at the modular interface connector, the plug-in module may automatically enable access to voice, video and/or data services at the customer premises, at 312. For example, video data processing at the network interface device may be automatically initialized, at 312, in response to detecting reception of the plug-in module at the modular interface connector.

In a particular embodiment, the method 300 includes, at 316, storing a provisioning record at a database associated with the remote communication network. The provisioning record may associate the particular plug-in module received at the interface connector with a subscriber account associated with the customer premise. The remote communication network may authorize the voice, video or data services to the customer premises at the network interface device based on the provisioning record.

The method 300 includes, at 318, receiving communication data from the remote communication network. For example, the communication data may include voice, video or data communications. The method includes, at 320, routing the communication data to one or more devices coupled to the network interface device via the coaxial wiring system or the telephone wiring system. For example, voice communication data may be provided via a plain old telephone service (POTS) protocol to one or more telephones via the telephone wiring system. In another example, video data may be provided to one or more display devices or set-top box devices via the coaxial wiring system, via the telephone wiring system, or via another twisted wire pair wiring system (e.g., an Ethernet system). In another example, data communications may be routed to one or more computing devices via the coaxial wiring system, via the telephone wiring system, or via another twisted wire pair wiring system.

The method 300 also includes, at 322, storing performance data associated with one or more components of the network interface device. For example, the performance data may be stored at a memory local to the network interface device or at a database associated with the remote communication network. The method 300 may also include, at 323, analyzing the performance data. For example, analyzing the performance data may include, at 324, comparing the performance data to one or more operational criteria 326 to identify one or more operational concerns before the operational concerns are perceptible by a user at the customer premise. The method 300 may also include, at 328, communicating results of the performance data analysis to a network unit of the remote communication network. For example, the performance data analysis may be communicated to the network unit to schedule a preventative maintenance activity such as sending a technician to address the one or more operational concerns before the operational concerns are perceptible by the user. Examples of operational concerns may include failure or improper operation of one or more of the components of the network interface device, loss of communication with the remote communication network or reduced quality of a signal received from the remote communication network, loss of line power, lost data packets or receipt of corrupt data packets, and so forth.

The method 300 may also include, at 330, disabling access to voice, video, or data services in response to removing one or more of the plug-in modules from the interface connectors. For example, video services provided by the remote communication network may be automatically enabled in response to connection of a video plug-in module associated with the subscriber account to the interface connector. The video services provided by the remote communication network may be disabled in response to removal of the video plug-in module from the interface connector. In another example, data communication services provided by the remote communication network may be automatically enabled in response to connection of a data plug-in module (e.g., a residential gateway module) associated with the subscriber account to the interface connector. The data communication services provided by the remote communication network may be disabled in response to removal of the data plug-in module from the interface connector. In yet another example, voice services provided by the remote communication network may be automatically enabled in response to connection of a voice plug-in module associated with the subscriber account to the interface connector. The voice services provided by the remote communication network may be disabled in response to removal of the voice plug-in module from the interface connector. Thus, a shortened time of a technician may be used to install, enable or disable voice, video or data communication services. In a particular embodiment, a customer may enable or disable voice, video or data services by self installation of an appropriate removable plug-in module at the customer's premise, thereby reducing cost and time associated with providing a technician for installation of hardware to enable or disable services available via the remote communication network.

In a particular embodiment, the network interface devices and removable plug-in modules described herein may allow customer self installation of particular communication services. The network interface devices and removable plug-in modules may also allow installation, enabling or disabling communication services without requiring that a customer be at home in order to access hardware inside the customer premise. Additionally, the network interface devices and removable plug-in modules may provide for remote troubleshooting of communication problems via loopback testing and more detailed troubleshooting of the communication problems via onboard testing and performance monitoring. Such troubleshooting may help to distinguish between problems inside the customer's premise (e.g., hardware or wiring), and problems outside of the customer's premise. Further, the network interface devices and removable plug-in modules may provide for simplified error correction. For example, errors may be corrected by removing and replacing one or more removable plug-in modules at the network interface device. Additionally, the network interface device and removable plug-in modules may provide for recoverability, exchangeability and reusability of various components of the network interface device, such as a video unit, a gateway, a data router, a controller, a power coupling device, a line conditioning unit, a connection manager, a diagnostic unit, or a memory. Further, the network interface devices and removable plug-in modules may be adapted to communicate via communication lines having a two wire configuration or a four wire configuration. For example, network interface devices may communicate via a standard twisted pair telephone line, via a T-1 line or via E-1 line.

Figure 4:
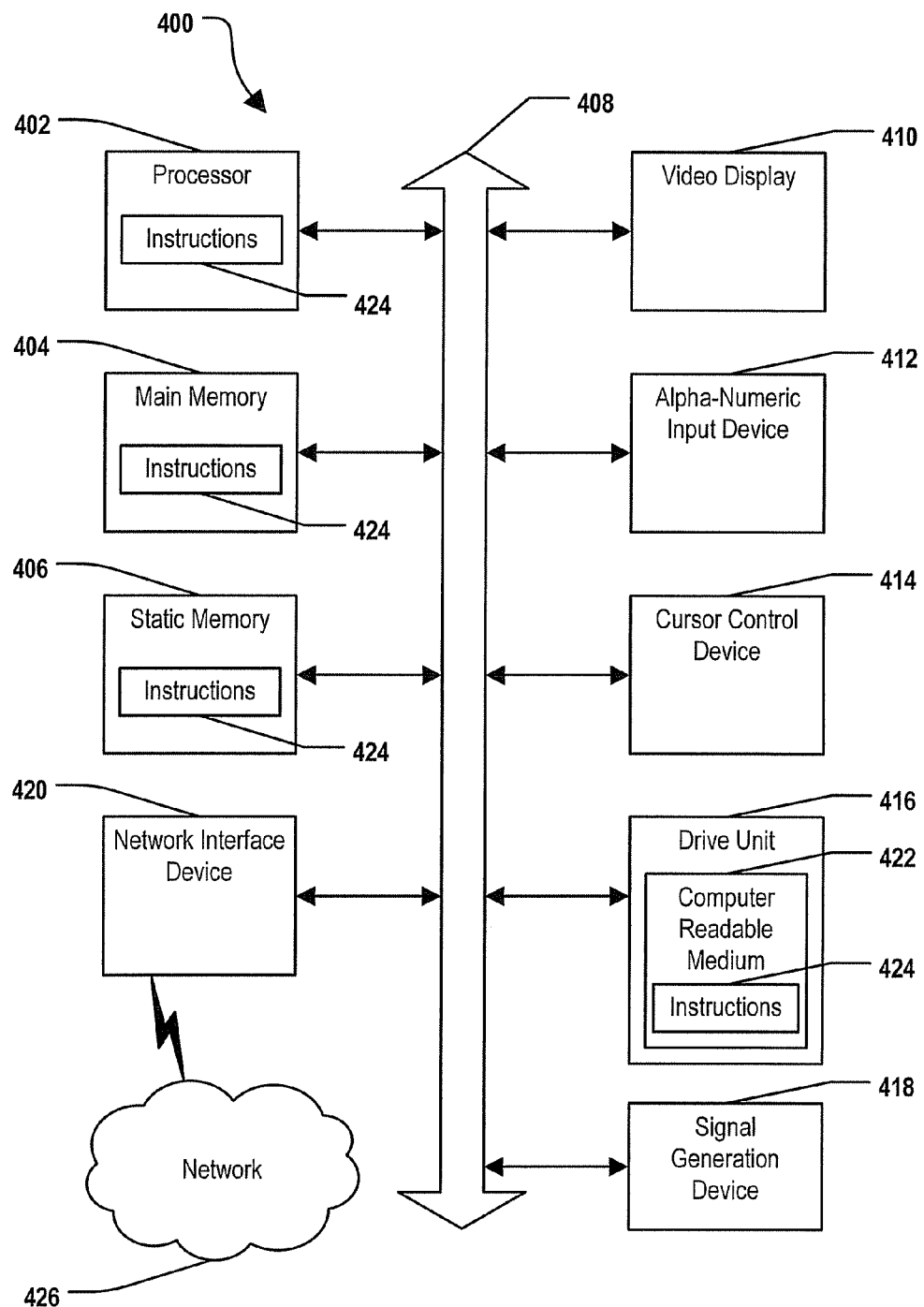
FIG. 4 is a block diagram of an embodiment of a general computer system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. For example, the computer system 400 may include or be included within any one or more of the databases, communication networks, field units, network interface devices, computing devices, or set-top box devices discussed with reference to FIGS. 1 and 2.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406, that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A network interface device comprising:
   a first network interface to terminate a communication line of a remote communication network;
   a second network interface to terminate a coaxial line; and
   a first interface connector to receive a first removable plug-in module, wherein the first removable plug-in module includes a video unit and wherein, when the first removable plug-in module is connected to the first interface connector, the video unit performs video operations comprising:
   receiving video data from a network device via the remote communication network; and
   processing the video data for communication via the coaxial line or a twisted wire pair; and
   a second interface connector to receive a second removable plug-in module that includes a power coupling device, wherein, when the second removable plug-in module is connected to the second interface connector, the power coupling device performs operations comprising:
   receiving power via the communication line; and
   providing power to the first removable plug-in module when the first removable plug-in module is connected to the first interface connector, wherein the video unit is operable to perform the video operations using a portion of the power received by the first removable plug-in module;
   wherein, when the second removable plug-in module is not connected to the second interface connector, the video unit of the first removable plug-in module connected to the first interface connector is inoperable to perform the video operations.

2. The network interface device of claim 1, wherein the video unit includes an output driver to communicate processed video data to a set top box device for display at a display device.

3. The network interface device of claim 1, further comprising a third interface connector to receive a third removable plug-in module, wherein the third removable plug-in module comprises a test unit coupled to the power coupling device, wherein the test unit performs loopback testing in response to a signal received via the remote communication network.

4. The network interface device of claim 1, wherein the communication line includes the twisted wire pair, a T1 line, an E1 line, or a combination thereof.

5. The network interface device of claim 1, wherein the second removable plug-in module further comprises a connection manager operable to manage a connection to the remote communication network coupled to the first network interface via the communication line.

6. The network interface device of claim 5, wherein the connection manager is operable to condition the communication line for data communication by communicating with the network device.

7. The network interface device of claim 5, wherein the connection manager is operable to:
   test the first removable plug-in module, the second removable plug-in module, or a combination thereof in response to receiving a test signal via the remote communication network; and communicate test results to a maintenance unit of the remote communication network.

8. The network interface device of claim 5, wherein the connection manager is operable to:
store performance data associated with the first removable plug-in module, the second removable plug-in module, or a combination thereof;
analyze the performance data; and
communicate a result of performance data analysis to a maintenance unit of the remote communication network.

9. The network interface device of claim 8, wherein analyzing the performance data comprises comparing the performance data to an operational criterion associated with the first removable plug-in module or the second removable plug-in module.

10. The network interface device of claim 1, wherein the video data comprises internet protocol television data.

11. The network interface device of claim 1, further comprising a controller coupled to the power coupling device and operable to:
detect connection of the first removable plug-in module to the first interface connector; and
automatically initialize video data processing at the video unit in response to determining the first removable plug-in module includes the video unit.

12. The network interface device of claim 1, wherein the video data received at the video unit from the network device is modulated using a very high speed digital subscriber line protocol, and wherein the video unit is to demodulate the video data received at the video unit to generate a home phone line networking alliance protocol signal for communication via the coaxial line or the twisted wire pair.

13. The network interface device of claim 1, further comprising a data router operable to receive communication data via the communication line and to route the communication data to a device coupled to the second network interface.

14. The network interface device of claim 13, wherein the first removable plug-in module, the second removable plug-in module, or a combination thereof includes the data router.

15. The network interface device of claim 1, further comprising a lightning protection unit coupled to the first network interface.

16. A method comprising:
detecting a first connection of a coaxial line interface of a network interface device to a coaxial wiring system at a customer premise;
detecting a second connection of a line interface of the network interface device to a set of communication lines, the second connection coupling the network interface device to a remote communication network;
detecting a third connection of a first removable plug-in module to a first interface connector of the network interface device, wherein, when the first removable plug-in module is connected to the first interface connector, the first removable plug-in module is operable to perform video operations comprising processing video data received from the remote communication network, the video data processed for communication via the coaxial wiring system; and
detecting a fourth connection of a second removable plug-in module to a second interface connector of the network interface device, wherein the second removable plug-in module includes a power coupling device, wherein, when the second removable plug-in module is connected to the second interface connector, the power coupling device performs operations comprising:
receiving power via the set of communication lines; and
providing power to the first removable plug-in module when the first removable plug-in module is connected to the first interface connector, wherein the first removable plug-in module is operable to perform the video operations using a portion of the power received by the first removable plug-in module;
wherein, when the second removable plug-in module is not connected to the second interface connector, the first removable plug-in module connected to the first interface connector by the third connection is inoperable to perform the video operations.

17. The method of claim 16, wherein the coaxial wiring system includes a splitter and an amplifier.

18. The method of claim 16, further comprising:
sending a provisioning request to a network device of the remote communication network in response to detecting connection of the first removable plug-in module, wherein the network device stores a provisioning record at a database, wherein the provisioning record links the first removable plug-in module with a subscriber account associated with the customer premise; and
receiving an indication that provisioning of service is enabled from the remote communication network.

19. The method of claim 16, further comprising automatically enabling access to a telephone service, a video service and a data service provided by the remote communication network in response to detecting connection of the first removable plug-in module associated with a subscriber account to the first interface connector.

20. The method of claim 19, further comprising:
in response to detecting removal of the first removable plug-in module from the interface connector, automatically disabling access to the video service, the data service, or a combination thereof.

21. A device comprising:
a housing;
a network interface device within the housing, the network interface device including a lightning protection device coupled to a remote network interface, wherein the remote network interface includes connectors to a remote communication network via a first set of twisted pair wires;
a local network interface within the housing, the local network interface including a coaxial connector;
a gateway within the housing, the gateway including a router to route data received from the remote communication network to a local device coupled to the local network interface;
a line conditioning unit within the housing, the line conditioning unit to condition the first set of twisted pair wires for a telephone service, a video service, a data service, or a combination thereof;
a first interface connector within the housing, the first interface connector to receive a first removable plug-in module, wherein the first removable plug-in module includes a video unit, wherein, when the first removable plug-in module is connected to the first interface connector, the video unit performs video operations comprising:
receiving video data from the remote communication network; and
processing the video data for communication via the coaxial connector;
a diagnostic unit within the housing, the diagnostic unit to monitor performance of the video unit, the gateway, the line conditioning unit, the first set of twisted pair wires, or a combination thereof;

a visual status display operable to indicate an operational status of the device; and a second interface connector within the housing, the second interface connector to receive a second removable plug-in module that includes a power coupling device, wherein, when the second removable plug-in module is connected to the second interface connector, the power coupling device performs operations comprising:

receiving power via the first set of twisted pair wires of the remote communication network; and providing power to the gateway, the line conditioning unit, the first removable plug-in module, the visual status display, and the diagnostic unit, wherein the first removable plug-in module receives the power when the first removable plug-in module is connected to the first interface connector, wherein the video unit is operable to perform the video operations using a portion of the power received by the first removable plug-in module;

wherein, when the second removable plug-in module is not connected to the second interface connector, the video unit in the first removable plug-in module connected to the first interface connector is inoperable to perform the video operations.

22. The network interface device of claim 1, further comprising a visual status display that is operable to indicate an operational status of the first removable plug-in module the second removable plug-in module, or a combination thereof.

23. The method of claim 16, wherein the first removable plug-in module is distinct from the second removable plug-in module.

24. The method of claim 19, further comprising in response to removal of the first removable plug-in module from the first interface connector, automatically disabling access to the telephone service, the video service, and the data service provided by the remote communication network.

\* \* \* \* \*